PTH17 XR 3,601,522

United States Patent

[11] 3,601,522

[72] Inventor James E. Lynch
Chattanooga, Tenn.

[21] Appl. No. 47,186
[22] Filed June 18, 1970
[45] Patented Aug. 24, 1971
[73] Assignee American Lava Corporation
Chattanooga, Tenn.
Continuation-in-part of application Ser. No. 843,461, July 22, 1969, now abandoned.

[54] COMPOSITE CERAMIC PACKAGE BREAKAWAY NOTCH
8 Claims, 16 Drawing Figs.

[52] U.S. Cl. 174/68.5, 29/625, 174/525, 174/DIG. 3, 317/101 CM, 317/101 CP
[51] Int. Cl. H05k 1/04, H05k 5/06
[50] Field of Search 174/68.5, 52.5, 50.2, 50.61, 50.63; 37/101 A, 101 CC, 101 CM, 101 D; 29/625–627; 204/15

[56] References Cited
UNITED STATES PATENTS

| | | | |
|---|---|---|---|
| 3,128,332 | 4/1964 | Burkig et al. | 174/68.5 |
| 3,189,978 | 6/1965 | Stetson | 29/625 |

*Primary Examiner*—Darrell L. Clay
*Attorney*—Kinney, Alexander, Sell, Steldt and Delahunt ABSTRACT: A small portion of the electrical circuit connecting at least two exposed conductive surfaces is applied on a segment, which may be single thin ply, of ceramic forming the composite structure. Breaking away of or otherwise removing the segment or thin ply is effective to separate the surfaces electrically. This is convenient in electroplating surfaces which are not readily accessible under certain plating conditions and provides grounding during mounting of chips.

INVENTOR.
JAMES E. LYNCH
BY Kinney, Alexander,
Sell, Steldt & De La Hunt
ATTORNEYS INVENTOR.
JAMES E. LYNCH
BY Kinney, Alexander, Sell, Steldt & DeLaHunt
ATTORNEYS INVENTOR.
JAMES E. LYNCH
BY Kinney, Alexander, Sell, Steldt & De La Hunt
ATTORNEYS

COMPOSITE CERAMIC PACKAGE BREAKAWAY NOTCH application is a continuation-in-part of my copending application, Ser. No. 843,461, filed July 22, 1969, now abandoned.

This invention relates to electrical conductors and particularly to conductors and terminals, including various metallic surface areas, provided in ceramic bases. Particularly this invention relates to structures for incorporation in articles comprising electrical conductors which structures permit irreversible interruption of electrical continuity between two or more connected terminals or metallic surfaces.

In the manufacture of ceramic composite packages and other such devices comprising conductors and terminals in or on a ceramic base which is often made up of several layers, it is often desirable to plate terminals, including other exposed metallic surface areas with gold to facilitate soldering or welding thereto and to provide superior electrical contacts. This is often done by electroplating. Contact to the various parts is effected by carrying out the plating in a quantity of metal spheres or shot which form the cathode or by attaching suitable leads and rack plating. It will be evident that success depends upon being able to establish and maintain electrical contact with each electrically isolated portion of the article at all times.

The present invention provides a frangible substructure of a single ply or ceramic segment bearing at least one electrical conductor in connective pattern as part of at least one electrical continuity in the article. Each electrical continuity is suitably between two or more metallized areas. The substructure is preferably so located that it does not interfere with the manufacturing operation or subsequent use of the article. At the appropriate time after necessity for electrical continuity has ceased, the small frangible portion is broken away irreversibly disconnecting the two or more metallized portions of the composite structure. The operation of breaking away the frangible portion may be by mechanical fracture or by abrasive methods such as grinding, sawing or sandblasting.

This invention is especially described by reference to the figures, wherein:

FIG. 1 shows a fired ceramic package for an integrated circuit incorporating a frangible disconnect element.

FIG. 2 shown an enlarged end view of the novel disconnect substructure of the package of FIG. 1.

FIG. 3 shown an enlarged partial section along line 3—3 of FIG. 1.

FIGS. 4, 5, and 6 show portions of the three separate plies employed in constructing the package of FIG. 1.

Figures 1, 2, 3:
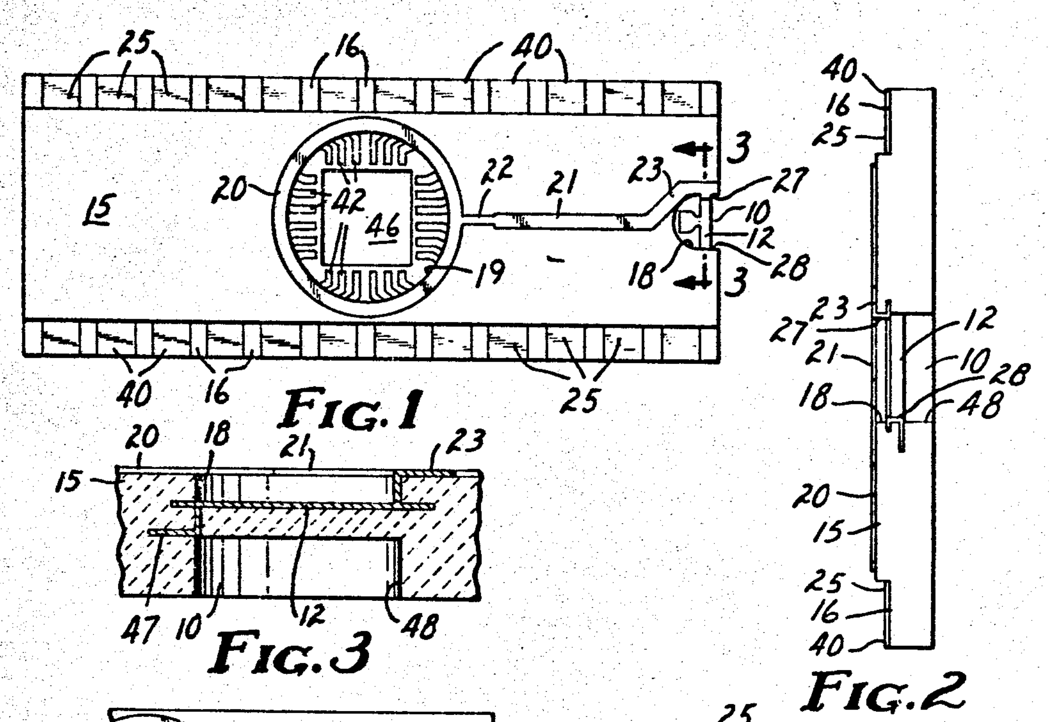

The breakaway notch 10, detailed in FIGS. 2 and 3, includes a frangible single ply 12 with connective pattern on it. It will be recognized that, in the ceramic package as shown, the three layers shown in FIGS. 4, 5, and 6 with metallic patterns thereon are integrally bonded together, e.g., by firing to maturity after being first molded together as known in the art.

Figures 4, 5:
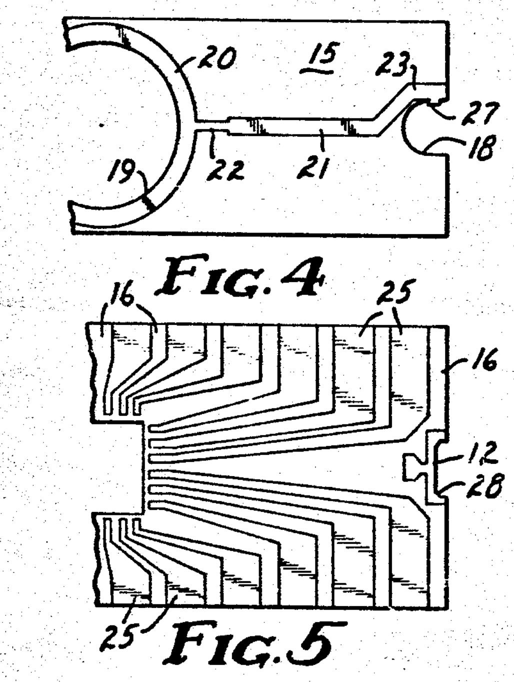
Figure 6:
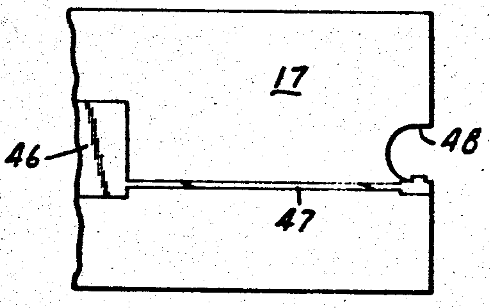
Figures 10, 11, 12:
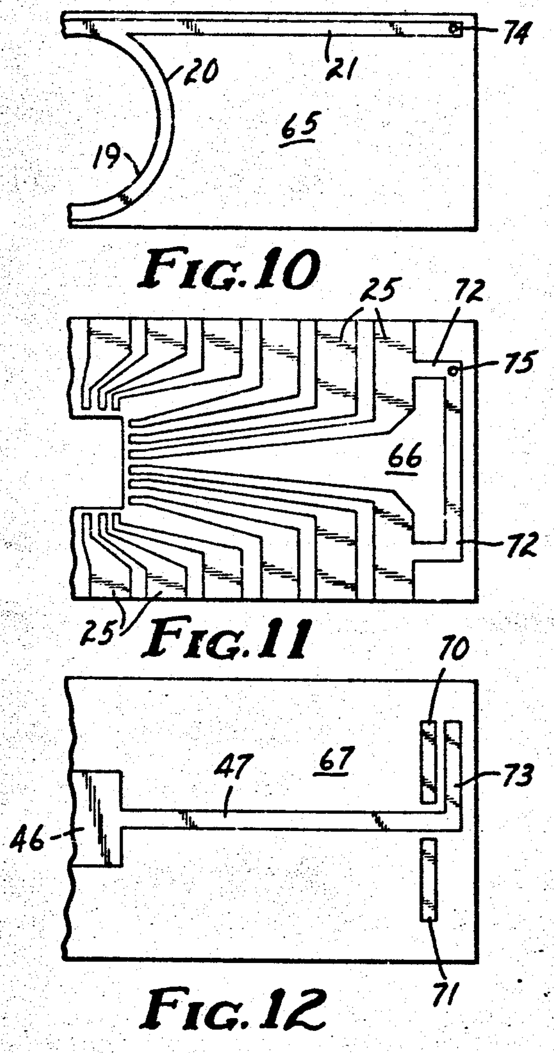
FIGS. 10, 11 and 12 show the plies employed in constructing the said structure and FIG. 13 shown an enlarged cross section through the structure of FIG. 9 along line 13—13.

The three sheets of FIGS. 4, 5, and 6 and also those of FIGS. 10, 11, and 12 are unfired and shrink on firing but no effort is made in these drawings to show this. The three sheets, 15, 16, and 17, respectively, are prepared separately or in multiple arrays as desired by methods known in the art. Sheet 15 is provided with notch 18 and opening 19 surrounded by ring frame 20 with doglegged lead 21 having necked portion 22 and dogleg 23. Necked portion 22 provides a two-dimensional venturi, and reduces flow of solder away from ring frame 20 when a lid (not shown) is being attached. Sheet 16 is provided with a pattern of conductors 25, conductive pattern 12 and small notch 28. The pattern of conductors 25 provides terminals 40 and 42 in the assembled package as shown in FIG. 1. Connective pattern 12 is applied so that some excess of the screening paste overlaps the end of sheet 16 into notch 28. This is evident in the cross section shown in FIG. 3. It is also desirable that dogleg 23 overlap the edge of notch 18 slightly shown at 27 to provide a conductive patch extending downward in the assembled package. It will be evident that the connective pattern 12 may also connect to other leads if desired and may have other shapes then that shown.

Sheet 17 is provided with pad 46, conductor 47 and notch 48. It will be seen that notches 18 and 48 are of essentially the same outline. However, they are different from notch 28 so that in the assembled structure of FIG. 1 much of that portion of sheet 16 bearing connective pattern 12 is exposed as a single ply of the multilayered structure. The connective pattern 12 by overlapping into notch 28 contacts conductor 48 and overlap 27 of dogleg 23 on sheet 15 contacts pattern 12 from above. The excess amounts of metallizing paste (e.g., tungsten, moly-manganese or noble metals) are enough so that electrical continuity is provided from ring frame 20 through lead 21 (including neck 22 and dogleg 23 and overlap 27) to connective pattern 12 and through conductor 47 (buried in the final package) to pad 46.

Figure 7:
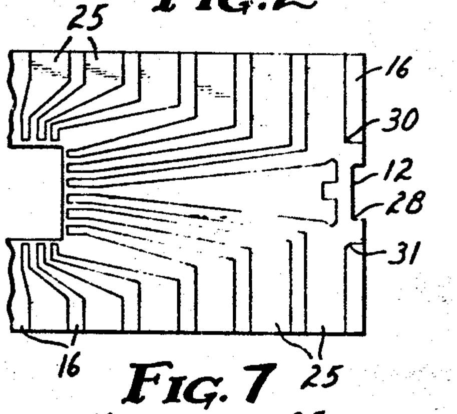
FIGS. 7 and 8 show alternative variations to the ply of FIG. 5.
Figure 8:
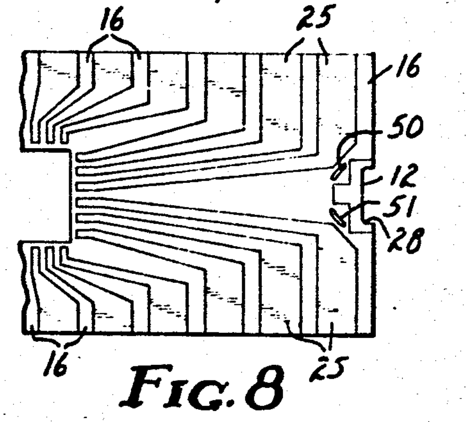

It will be recognized that the conductive patterns of this embodiment are exemplary and that numerous variations are also useful with the breakaway structure of the invention. Optionally, one or more connections (as shown in FIG. 7) may be made to members of conductive pattern 25 if this is desired. FIG. 7 shows a structure which may be used to provide the conductive pattern 25, of FIG. 5 with additional connections, 30 and 31. In FIG. 8, holes 50 and 51 are provided to increase the frangibility of the ply 16 and such holes, perforations or dinking cuts may be employed when thicker pieces of ceramic may be more difficulty broken. In both FIGS. 7 and 8 structures identical to those of FIG. 5 bear the same indicia.

Figure 15:
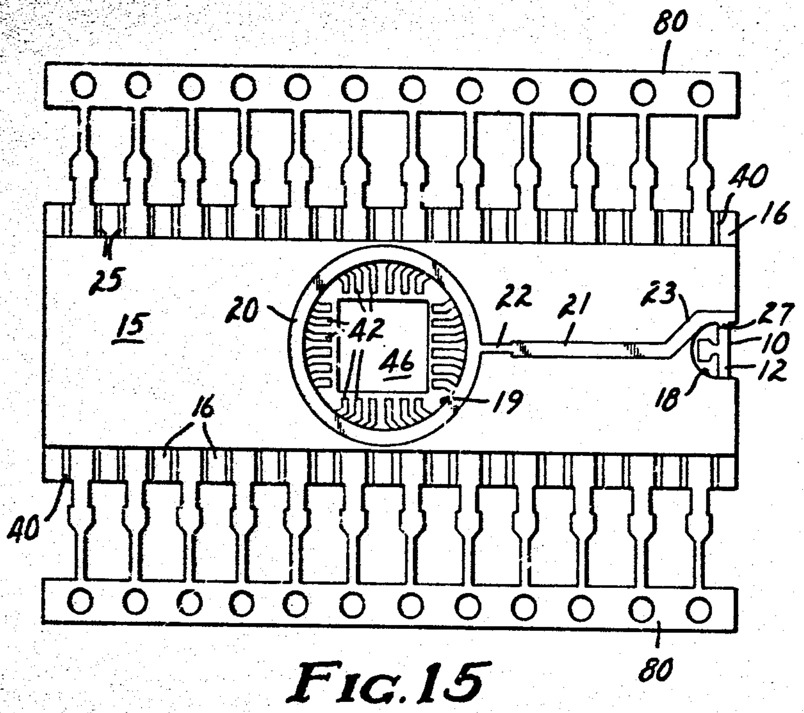
FIG. 15 shows a fired ceramic package of FIG. 1 with lead frames attached to the terminals.

The connections, 30 and 31, in FIG. 7 assure electrical continuity not only to ring frame 20 and pad 46 but also to portions of conductive pattern 25. Such an arrangement is useful when all metallic surface areas are electrically united and contact to any one is then sufficient for electroplating the whole. Such is the case when lead frames 80 are attached along the terminals 40 as shown in FIG. 15. An electrical contact to any exposed part of the conductive path is therefore sufficient to supply electrical potential to all parts and also serves to ground static electrical charges during mounting of chips or bonding of wires. In a plating operation, plating of pad 46 is assured even if the pad is not easily accessible to direct electrical contact. Such is particularly the case when a very small pad is used for a small chip. Lead frames 80 (shown in FIGS. 15 and 16) are cut after mounting and sealing of the enclosed circuit chip. Inasmuch as the necessity of electrical connection between ring frame 20 and pad 46, and in alternative cases to pattern 25, no longer exists and may even be undesirable after the plating operation, and before placing in service they are disconnected by interrupting electrical continuity by breaking away or otherwise destroying the small single ply of sheet 16 bearing the connective pattern 12.

As will be evident from the cross section in FIG. 3, sheet 17 is about twice as thick as either sheet 15 or 16 and it is convenient, but not necessary, that the frangible ply be no thicker then any other ply and preferably less than one-third the total thickness of the multilayer composite in which it is embedded. As noted, cuts, holes, perforations and other means may be employed to enhance frangibility.

The individual layers are conveniently prepared using leathery green sheets as provided in U.S. Pat. No. 2,966,719 and conductors and connective patterns are screened using a metallic ink conventional for the purpose in which the metal is compatible with firing of the ceramic. Particularly useful ceramics contain 80 percent or more and preferably 90 percent or more up to substantially 100 percent of alumina. Metals which may be used for conductors include tungsten, molybdenum, manganese, platinum or palladium.

It will be apparent that other variations within the scope of the invention are possible for breakaway circuit interruptions.

Figure 9:
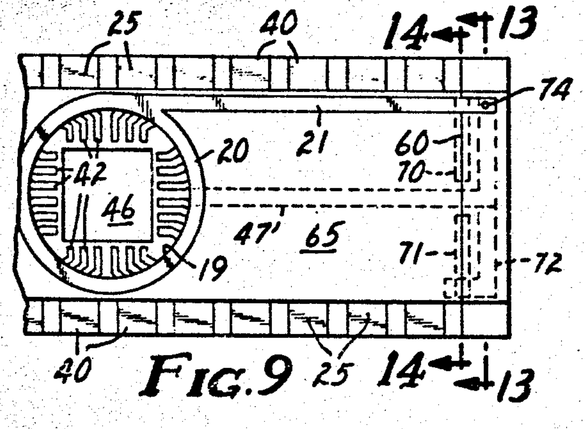
FIG. 9 shows an alternative breakaway structure.

Such is illustrated in FIGS. 9 through 13 in which a package is constructed having contacts and terminals essentially identical. Identical or substantially identical parts bear the same indicia as in FIGS. 1 to 8 inclusive. The plies of FIGS. 10, 11 and 12 are designated 65, 66 and 67 respectively. The package of FIG. 9 is intended to have one end broken away along cut line 60 of FIG. 9. This line may be made by any of several methods. As shown, it is intended that it be cut by a laser beam after the assembled package is fired and for that reason reflecting metallic pads 70 and 71 are included which can stop the laser beam. These pads have no electrical function. The effect of the laser cut is shown in FIG. 14. It will be seen that where not protected by metallic layers the unified ceramic structure is cut through. The indicia are as indicated above.

Figure 13:
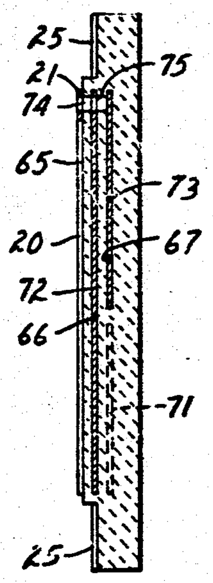
Figure 14:
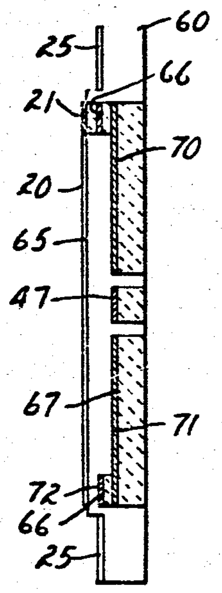
FIG. 14 shows an enlarged cross section through the structure of FIG. 9 along line 14—14 which is a cut by laser designated 60.

FIG. 13 shows that instead of making connections by overlapping edges as shown in FIGS. 1–6, connection from the prolongation of lead 21 is through via-hole 74 to connector 72 of FIG. 11 and then through via-hole 75 to branch 73 of conductor 47 of FIG. 12.

Figure 16:
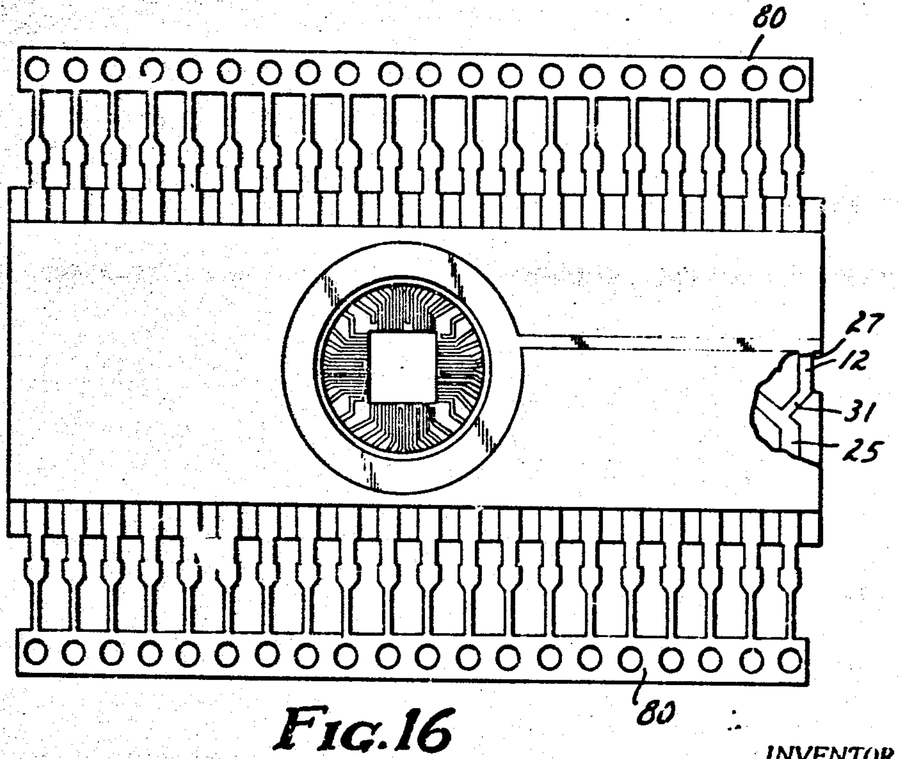
FIG. 16 shows a fired ceramic package for an integrated circuit, a small section being broken away, and having ring frame and pad and 40 lateral terminals with leads attached and including a breakaway notch of the invention.

Package units including breakaway notches and having attached lead frames 80 are shown in FIGS. 15 and 16. FIG. 15 shows package units with 24 leads as in FIG. 1, FIG. 16 shows a unit with 40 terminals. A small section of the topmost layer is broken away to expose the connection from one end of the connective pattern 12 to conductive pattern 25 which connects to lead frame 80. A similar construction at the other end of the connective pattern 12 (similar to FIG. 7) assures electrical grounding of all parts for plating or other purposes.

It will also be evident that several irreversible circuit interruptions of the types shown above can be provided and that they may be on one or on each of several plies or may include any number of plies in multilayer structures. When reliance cannot be placed on overlap structures for connection between the levels in the composite it is within the skill of the art to provide via-holes or risers between various levels to connect to the frangible or breakaway ply or ear as shown in FIGS. 9–13 inclusive. Alternatively connections may be screened on separately. Other modifications will be apparent to those skilled in the art.

The embodiments of the invention in which an exclusive property or privilege is claimed are defined as follows:

1. A fired ceramic composite having pluralities of buried electrical conductors and exposed metallic areas in combination with a frangible disconnect element positioned between at least two of said exposed metallic areas providing electrical continuity therebetween, said disconnect element consisting essentially of a ceramic segment of greater frangibility than said ceramic composite as a whole and a conductive pattern completing said electrical continuity.

2. A fired ceramic composite according to claim 1 wherein the frangible ceramic segment of the disconnect element is partly separated from the fired composite as a whole by cuts or perforations.

3. A fired ceramic composite according to claim 1 wherein the frangible ceramic segment is less than the total thickness of the fired ceramic composite.

4. A fired ceramic composite according to claim 2 wherein the ceramic segment is less than one-third the total thickness of the fired ceramic composite.

5. A fired ceramic composite according to claim 2 wherein the frangible ceramic segment is a single ply in thickness in a multilayer construction.

6. A fired ceramic composite according to claim 1 wherein the ceramic contains 80 percent or more of alumina.

7. A fired ceramic composite according to claim 1 wherein the conductive pattern comprises metal selected from the group consisting of tungsten, molybdenum, manganese, palladium and platinum.

8. The method for providing electrically isolated terminals and/or land areas in a fired ceramic composite comprising the steps of plating exposed metallic areas in a fired composite having at least two said exposed metallic areas electrically connected by a conductive pattern on a ceramic segment of greater frangibility than said composite as a whole and thereafter breaking away said ceramic segment whereby said conductive pattern is destroyed and said exposed metallic areas are electrically isolated.